United States Patent
Kojc et al.

(10) Patent No.: US 12,341,211 B2
(45) Date of Patent: Jun. 24, 2025

(54) LATERAL BATTERY BRACKET COMPRISING TWO SEMI PRODUCTS

(71) Applicant: SAMSUNG SDI CO., LTD., Yongin-si (KR)

(72) Inventors: Miran Kojc, Hausmannstätten (AT); Thomas Burke, Ligist (AT)

(73) Assignee: SAMSUNG SDI CO., LTD. (KR)

( * ) Notice: Subject to any disclaimer, the term of this patent is extended or adjusted under 35 U.S.C. 154(b) by 332 days.

(21) Appl. No.: 18/058,661

(22) Filed: Nov. 23, 2022

(65) Prior Publication Data

US 2023/0163394 A1    May 25, 2023

(30) Foreign Application Priority Data

Nov. 25, 2021   (EP) .................................... 21210596
Nov. 23, 2022   (KR) ........................ 10-2022-0158664

(51) Int. Cl.
*B60K 1/04*    (2019.01)
*H01M 50/224*  (2021.01)
*H01M 50/249*  (2021.01)

(52) U.S. Cl.
CPC ............. *H01M 50/249* (2021.01); *B60K 1/04* (2013.01); *H01M 50/224* (2021.01); *H01M 2220/20* (2013.01)

(58) Field of Classification Search
CPC ...... H01M 50/249; H01M 50/224; B60K 1/04
See application file for complete search history.

(56) References Cited

U.S. PATENT DOCUMENTS

| 10,494,030 B1 | 12/2019 | Paramasivam et al. |
| 10,946,904 B2* | 3/2021 | Kato .................. B62D 25/2036 |
| 2018/0208038 A1 | 7/2018 | Ozawa et al. |
| 2018/0287227 A1 | 10/2018 | Jeong et al. |

FOREIGN PATENT DOCUMENTS

| DE | 10-2020-103240 B3 | 6/2021 |
| EP | 3 382 774 A1 | 10/2018 |
| JP | 11-297290 A | 10/1999 |
| WO | WO 2018-166895 A1 | 9/2018 |

OTHER PUBLICATIONS

Extended European Search Report issued in corresponding application No. EP 21210596.9, dated May 27, 2022, 7 pages.

* cited by examiner

*Primary Examiner* — Jason D Shanske
*Assistant Examiner* — James J Triggs
(74) *Attorney, Agent, or Firm* — WOMBLE BOND DICKINSON (US) LLP

(57) ABSTRACT

A battery bracket for mounting a battery pack case to a vehicle is provided. The battery bracket includes: an outer structure having a lower part and an upper part forming a cavity therebetween; and an inner structure in the cavity. The outer structure is configured to be fixed to an outer side face of the battery pack case. The inner structure meanders between the lower part and the upper part of the outer structure such that a lower contact area and an upper contact area are formed at where the inner structure contacts the lower part of the outer structure and the upper part of the outer structure, respectively.

17 Claims, 3 Drawing Sheets

LATERAL BATTERY BRACKET COMPRISING TWO SEMI PRODUCTS

CROSS-REFERENCE TO RELATED APPLICATION

This application claims priority to and the benefit of European Patent Application No. 21210596.9, filed in the European Patent Office on Nov. 25, 2021, and Korean Patent Application No. 10-2022-0158664, filed in the Korean Intellectual Property Office on Nov. 23, 2022, the entire content of both of which are incorporated herein by reference.

BACKGROUND

1. Field

Aspects of embodiments of the present disclosure relate to a lateral battery bracket comprising two semi products, viz. an outer structure and an inner structure.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle additionally powered by, for example, a gasoline generator or a hydrogen fuel power cell. Furthermore, the vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or prismatic, may be selected based on the battery's intended purpose. Lithium-ion (and similar lithium polymer) batteries, widely known via their use in laptops and consumer electronics, dominate the most recent electric vehicles in development.

Rechargeable batteries may be used as a battery module formed of a plurality of unit battery cells coupled together in series and/or in parallel to provide high energy content, such as for motor driving of a hybrid or fully electric vehicle. That is, the battery module is formed by interconnecting the electrode terminals of the plurality of unit battery cells based on a desired amount of power and to realize a high-power rechargeable battery.

Battery modules can be constructed either in block design or in modular design. In the block design, each battery is coupled to a common current collector structure and a common battery management system, and the unit thereof is arranged in a housing. In the modular design, pluralities of battery cells are connected together to form submodules, and several submodules are connected together to form the battery module. In automotive applications, battery systems often include a plurality of battery modules connected together in series to provide a desired voltage. Therein, the battery modules may include submodules with a plurality of stacked battery cells, and each stack includes cells connected in parallel that are, in turn, connected in series (XpYs) or cells connected in series that are, in turn, connected in parallel (XsYp).

A battery pack is a set of any number of (usually identical) battery modules. They may be configured in series, parallel, or a mixture of both to deliver the desired voltage, capacity, and/or power density. Components of battery packs include the individual battery modules and the interconnects, which provide electrical conductivity between the battery modules.

The mechanical integration of such a battery pack requires appropriate mechanical connections between the individual components, for example, the battery modules, and between them and a supporting structure of the vehicle. These connections should remain functional and safe during the average service life of the battery system. Further, installation space and interchangeability requirements must be met, especially in mobile applications.

Mechanical integration of battery modules may be achieved by providing a carrier framework and by positioning the battery modules thereon. Fixing the battery cells or battery modules may be achieved by fitted depressions in the framework or by mechanical interconnectors, such as bolts or screws. Alternatively, the battery modules may be confined by fastening side plates to lateral sides of the carrier framework. Further, cover plates may be fixed atop and below the battery modules.

The carrier framework of the battery pack is often mounted to a carrying structure of the vehicle. When the battery pack is to be fixed at the bottom of the vehicle, the mechanical connection may be established from the bottom side by, for example, bolts passing through the carrier framework of the battery pack. The framework is usually made of aluminum or an aluminum alloy to reduce the total weight of the construction.

Battery systems, according to the related art, despite any modular structure, usually include a battery housing that acts as enclosure to seal the battery system against the environment and provides structural protection for the battery system components. Housed battery systems are usually mounted as a whole into their application environment, such as an electric vehicle. Thus, the replacement of defective system parts, for example a defect battery submodule, requires dismounting the whole battery system and removal of its housing first. Even defects of small and/or cheap system parts might then require dismounting and replacement of the complete battery system and its separate repair. As high-capacity battery systems are expensive, large, and heavy, this procedure is burdensome and the storage, for example in the mechanic's workshop, of the bulky battery systems becomes difficult.

Most battery pack cases are aluminum-casted battery pack cases with battery brackets made of screwed steel or cast by aluminum die pressure. This restricts the possibilities of mounting the battery pack into a vehicle, as connecting the battery pack case to the vehicle chassis is only possible in several chosen points.

SUMMARY

Embodiments of the present disclosure overcome or reduce at least some of the drawbacks of the related art and to provide a battery pack with improved characteristics at least as to geometry, production, and material properties. In particular, embodiments of the present disclosure provide a lateral battery member (e.g., a battery bracket) as part of housing structure that can take a load of one or more foreign impact bodies (e.g., in case of a crush or crash event on vehicle level) coming from a side.

The present disclosure is defined by the appended claims and their equivalents. Any disclosure outside the scope of the claims and their equivalents is intended for illustrative as well as comparative purposes.

One embodiment of the present disclosure is a battery bracket for mounting a battery pack case inside a vehicle. The battery bracket includes: an outer structure having a lower part and an upper part forming a cavity therebetween; and an inner structure arranged in the cavity. The outer structure is configured to be fixed to an outer side face of the battery pack case. The inner structure meanders between the lower part and the upper part such that the inner structure has one or more lower contact areas where it contacts the lower part and one or more upper contact areas where it contacts the upper.

Another embodiment of the present disclosure provides a battery pack including a case, the case having at least one outer side face on which a battery bracket according to the afore-described embodiment is fixed.

Yet another embodiment of the present disclosure provides a vehicle including at least one battery pack according to the afore-mentioned embodiment.

Further aspects and features of the present disclosure can be learned from the dependent claims and/or the following description.

BRIEF DESCRIPTION OF THE DRAWINGS

Aspects and features will become apparent to those of ordinary skill in the art by describing, in detail, embodiments thereof with reference to the attached drawings in which.

DETAILED DESCRIPTION

Figure 1:
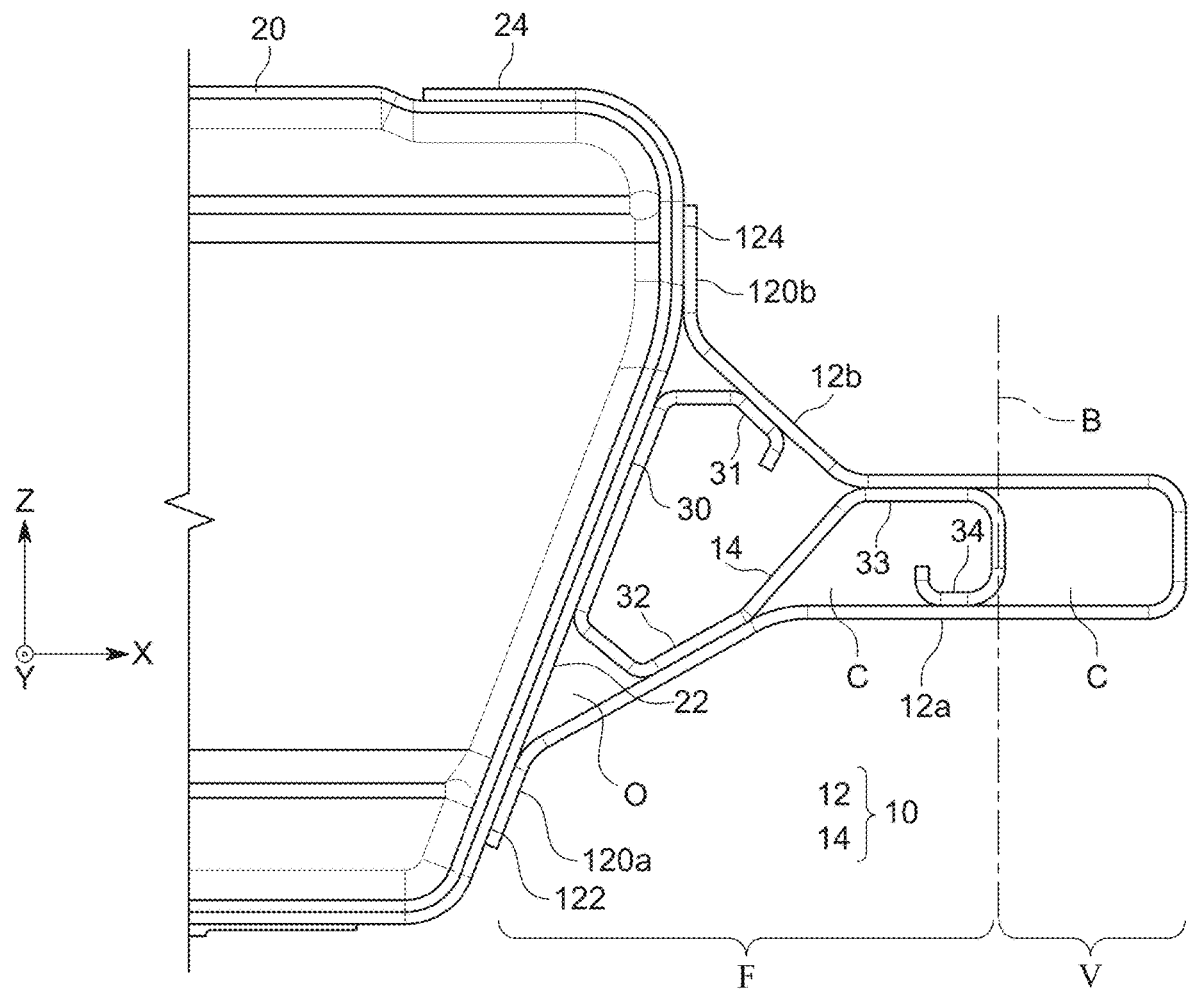
FIG. 1 is a schematic cross-sectional view of a battery bracket according to an embodiment.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions thereof may be omitted. The present disclosure, however, may be embodied in various different forms and should not be construed as being limited to the embodiments illustrated herein. Rather, these embodiments are provided as examples so that this disclosure will be thorough and complete and will fully convey the aspects and features of the present disclosure to those skilled in the art.

Accordingly, processes, elements, and techniques that are not considered necessary to those having ordinary skill in the art for a complete understanding of the aspects and features of the present disclosure may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items. Expressions, such as "at least one of," when preceding a list of elements, modify the entire list of elements and do not modify the individual elements of the list. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

To facilitate the description, a Cartesian coordinate system with x, y, and z axes may be provided in at least some of the figures. Herein, the terms "upper" and "lower" are defined according to the z-axis. For example, the upper cover is positioned at the upper part of the z-axis, and the lower cover is positioned at the lower part thereof. In the drawings, the sizes of elements may be exaggerated for clarity. For example, in the drawings, the size or thickness of each element may be arbitrarily shown for illustrative purposes, and thus, the embodiments of the present disclosure should not be construed as being limited thereto.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

A first embodiment of the present disclosure provides a battery bracket for mounting a battery pack case inside a vehicle. The battery bracket includes: an outer structure having a lower part and an upper part forming a cavity between the lower part and the upper part; and an inner structure arranged in the cavity. The outer structure is configured to be fixed to an outer side face of the battery pack case. The inner structure meanders between the lower part and the upper part such that the inner structure has one or more lower contact areas and one or more upper contact areas. The inner structure contacts the lower part in the lower contact areas and contacts the upper part in the upper contact areas.

As used herein, the term "battery pack case" relates to a case configured to house (or accommodate) a battery pack. Also, the term "region" or the like may be used in the present context instead of, or in addition to, the term "area." This holds also for the following remarks and explanations. Also, the term "casing" or "housing" may be used instead of, or in addition to, "case." Further, the terms "lower" and "upper" are used to distinguish the two different parts of the outer structure in a simple, intuitive, and easily understandable manner. Of course, the terms "lower part" and "upper part" could be replaced, throughout the complete disclosure, by, for example, the expressions "first part" and "second part". Also, the term "battery lateral member" may be alternatively used for "battery bracket."

In embodiments, the inner structure may have one, two, three, four, five, six, or more lower contact areas. Further, the inner structure may have one, two, three, four, five, six, or more upper contact areas.

In embodiments, there may be lower and/or upper contact areas at where the inner structure is not fixed to the respective lower and/or upper part. In such embodiments, the inner structure may glide or slide on the inner surface of the outer structure (e.g., on the surface of the cavity) when the outer structure deforms such that a force is exerted to at least some of the lower and/or upper contact areas of the inner structure. However, due to the elasticity of the inner structure, counteracting forces are exerted by the inner structure to the outer structure through the contact areas. These counteracting forces support (e.g., stabilize) the outer structure to a certain degree while at the same time allowing for deformation of the outer structure.

The term "meandering" may indicate that the inner structure contacts the lower part and the upper part of the outer structure in an alternating manner. However, in other embodiments, the inner structure may contact one of the lower and upper part of the outer structure two or more times before then contacting the respective other part of the outer structure.

The fixation of the outer structure to a side face of the battery pack may be established by welding (e.g., by weld seams). However, in some embodiments, the fixation of the outer structure to a side face of the battery pack may be established, alternatively or additionally, by other fixing methods, such as screwing.

According to one embodiment of the battery bracket, the inner structure is fixed to the lower part in at least one of the lower contact areas.

According to one embodiment of the battery bracket, the inner structure is fixed to the upper part in at least one of the upper contact areas.

In embodiments, the inner structure is fixed to the lower part of the outer structure in one, two, three, four, five, six, or more lower contact areas. Further, the inner structure may be fixed to the upper part of the outer structure in one, two, three, four, five, six, or more upper contact areas.

In embodiments, the inner structure may be fixed to the lower part of the outer structure at all of the lower contact areas. Further, the inner structure may be fixed to the upper part of the outer structure at all of the upper contact areas.

When the inner structure only contacts the inner surface of the cavity without being fixed thereto, the stabilization effect (e.g., the support) of the inner structure onto the outer structure in the event of deformation of the outer structure is increased due to, for example, shear forces transmitted through the inner structure between those lower and upper contact areas at where the inner structure is fixed to the outer structure. Deformation of the outer structure due to external forces acting on the outer structure may, thus, be reduced when compared to embodiments where the inner structure is not fixed to the outer structure.

The fixation(s) of the inner structure to the lower part and/or the upper part of the outer structure may be established by welding (e.g., by weld seams). However, in some embodiments, the fixation(s) of the inner structure to the lower part and/or the upper part may be established, alternatively or additionally, by other fixing methods, such as screwing.

According to one embodiment of the battery bracket, the cavity formed between the lower part and the upper part has an opening. The lower part includes a lower flange at the opening, and the upper part includes an upper flange at the opening. The lower flange and the upper flange are each configured to be fixed to an outer side face of the battery pack case.

In one embodiment, the lower flange and the upper flange are each directed away from the opening of the cavity. The flanges are each an example of a fastener that allows for fixation of the outer structure to a side face of the battery pack. In other embodiments, however, other methods of fastening may be provided, alternatively or additionally, to allow for fixation of the outer structure to a side face of the battery pack.

According to one embodiment of the battery bracket, a region of the cavity located opposite to the opening is left void. The expression "left void" denotes that the respective region of the cavity is not filled by the inner structure. Accordingly, the outer structure is not supported by the inner structure such that this region is a first "crush zone," in which external mechanical energy operating on (or incident to) the outer structure may be absorbed by deformation of the first "crush zone" to a larger extent than in the region of the outer structure being internally supported by the inner structure (e.g., a second "crush zone").

When the battery bracket is fixed to a side face of a case of a battery pack, a distal end (e.g., a region opposite to the region fixed to the side face or the region closest to the side face) of the inner structure is arranged at a distance to a distal end of the outer structure such that a "crush zone" (e.g., the first "crush zone") having lower rigidity is provided outside (or away from) the distal end of the inner structure compared to a further "crush zone" (e.g., the second "crush zone") having higher rigidity in the region when the inner structure is located inside the outer structure.

According to one embodiment of the battery bracket, the cross-sectional profile of the outer structure tapers, at least in a region of the cross-sectional profile, when viewed along a direction from the opening of the cavity through the cavity or into the cavity.

According to one embodiment of the battery bracket, a region of the inner structure is configured to be fixed to an outer side face of the battery pack case.

The afore-mentioned region of the inner structure is configured to be fixed to an outer side of a case of a battery pack that faces the opening of the cavity formed by the outer structure as, otherwise, no mechanical connection between the inner structure and the case could be established. When the battery bracket is mounted on the case of a battery pack, each of the lower flange, the upper flange, and the afore-mentioned region of the inner structure configured to be fixed to an outer face of a case of a battery pack are fixed at a time to a face of the case of a battery pack.

The fixation (or fixing) of the inner structure to a side face of the battery pack may be established by welding (e.g., by a weld seam). However, in some embodiments, the fixation of the inner structure to a side face of the battery pack may be established, alternatively or additionally, by other fixing methods, such as screwing.

According to one embodiment of the battery bracket, the region of the inner structure configured to be fixed to an outer side face of the battery pack case is located on a surface of the inner structure between one of the lower contact areas of the inner structure and one of the upper contact areas of the inner structure.

When viewing a cross-sectional profile of the battery bracket when fixed to a side face of a case of a battery pack, the inner structure may first contact (or may be fixed to), for example, the upper part of the outer structure and then be fixed to the side face of the battery pack, and subsequently contact (or may be fixed to) the lower part of the outer structure.

According to one embodiment of the battery bracket, the cross-sectional profile of the battery bracket is constant at least in a region of the bracket when viewed in a direction perpendicular to the outer side face.

For example, there is one direction relative to the battery bracket measured in which the curvature of the outer structure as well as the curvature of the inner structure is zero for any arbitrary point of a surface of the respective (e.g., outer or inner) structure. Any curvatures of the outer structure as well as of the inner structure are curvatures having parallel axes of curvature (the curvature and the respective axis of curvature generally differentially change for any point of a surface of a curved structure, hence also for any point of the outer structure and any point of a surface of the outer structure). Usually, the battery bracket is an elongated body configured to extend along the planar side face of a case of a battery pack. When the battery bracket is fixed to the side face of the case, the cross-sectional profile of the battery bracket is the same for all cross-sections taken perpendicularly to the side face at least over the main region of the side face. In embodiments, however, the ends of the battery brackets (with regard to a direction perpendicular to the afore-mentioned cross-sections) may have different cross-sections, for example, to form end caps of the battery brackets or the like.

According to one embodiment of the battery bracket, the outer structure is made of a sheet of metal, such as a sheet of metal made of one piece of metal.

According to one embodiment of the battery bracket, the inner structure is made of a sheet of metal, such as a sheet of metal made of one piece of metal.

According to one embodiment of the battery bracket, the outer structure is made of a sheet of steel.

According to one embodiment of the battery bracket, the inner structure is made of a sheet of steel.

According to one embodiment of the battery bracket, the outer structure is made of a cold roll-formed steel.

According to one embodiment of the battery bracket, the inner structure is made of a cold roll-formed steel.

According to one embodiment of the battery bracket, the outer structure and the inner structure are each made of a cold roll-formed steel, and the cold roll-formed steel of the outer structure has a higher steel material grade than the cold roll-formed steel of the inner structure.

A second embodiment of the disclosure provides a battery pack including a case. The case has at least one outer side face on which a battery bracket according to the first embodiment is fixed.

In some embodiments, the case of a battery pack has a substantially cuboid shape or is formed like a parallelepiped or like a prism, for example, like a prism with a trapezoidal base area. Such cases of a battery pack have six (substantially planar) side faces. Accordingly, in embodiments of battery packs, battery brackets, such as those described above, may be mounted onto one, two, three, four, five, or six of the side faces of a case of a battery pack.

In one embodiment of the battery pack according to the present disclosure, the at least one outer side face has an outer layer made of steel.

In one embodiment of the battery pack according to the present disclosure, the case includes at least one stiffener formed in a planar shape and arranged perpendicular to an outer side face to which the battery bracket is fixed.

A third embodiment of the disclosure provides a vehicle including at least one battery pack according to the second embodiment described above.

Implementing materials with higher strength, better ductile behavior and, consequently, fatigue behavior, can, from a mechanical point of view, allow for better overall performance of the battery pack housing (e.g., a housing with welded brackets) and at the same time save (or reduce) the space required for the rechargeable energy storage system (RESS) in a vehicle chassis to provide higher volumetric (or mass) energy density.

For example, the crush folding zone of one or more lateral members (in the following also referred to as "battery brackets") should stay outside of the battery pack housing and the space of the cell stacks. For example, a covering of the lateral battery housing length with a lateral member can distribute an impactor force on further stiffener elements of the battery pack housing.

Steel is a common material as it is easily to handle during production (e.g., by forming, cutting, joining, etc.). Steel also exhibits high fire resistance: The melting point of steel is high enough that degradation of physical material properties with raising of temperature is less significant in comparison to other metals commonly in use, such as aluminum. This concerns, for example, the (offset) yield point $R_{p0,2}(T)$, the tensile strength $R_m(T)$, and the expansion coefficient $\varepsilon(T)$, each of these quantities being a function of the temperature T. For example, the expansion coefficient $\varepsilon(T)$ can contribute to a safer battery system in a case of malfunction of the latter (e.g., thermal runaway of battery the cells and, as a consequence thereof, thermal propagation).

Another aspect of the present disclosure involves the way of fixing battery brackets onto the battery pack housing. For example, welding of battery brackets on the battery pack housing may contribute to cost saving during manufacture, at transport, and even with regard to investment costs (e.g., tooling) in comparison with battery brackets being implemented in design solution as separate parts.

To design a lateral battery member (e.g., a battery bracket) as part of housing structure that can take a load of one or more foreign body impacts (e.g., in the event of a crush or crash event on vehicle level) coming from aside, the lateral battery member exhibits suitable ductile behavior (e.g., from geometrical and material point of view). The lateral battery member guides (e.g., distributes) the force of an external impact (or impactor) to the stiffener structure inside the housing while at the same time prohibiting deformation of battery cells inside the housing. Thus, crush zone(s) (e.g., crush folding zone(s)) of the lateral member stay outside the battery case. Moreover, the lateral battery member has progressive resistance behavior to the impact.

FIG. 1 is a schematic cross-sectional view of a battery bracket 10 according to an embodiment of the present disclosure. In FIG. 1, the battery bracket 10 is shown in a state of being mounted onto an outer side face 22 of a battery pack case 20 that accommodates a battery pack. Only a part of the battery pack case 20 is shown in FIG. 1. The battery bracket 10 includes an outer structure 12 and an inner structure 14. The outer structure 12 and the inner structure 14 are two different linear semi-products, each being, for example, a cold roll-formed steel profile. The term "linear" refers to the y-axis of the coordinate system orientated perpendicular to the drawing plane of FIG. 1. For example, the outer structure 12 and the inner structure 14 extend linearly along the y-direction (see, e.g., FIGS. 2 and 3), and the cross-sectional profile of the battery bracket 10 as shown in FIG. 1 is the same for any intersection (or cross-section) through the battery bracket 10 taken along a plane parallel to the x-z-plane (i.e., parallel to the drawing plane of FIG. 1).

In embodiments, the cold roll-formed steel profile forming the outer structure 12 is made of a material belonging to a group of steel materials with higher steel material grades (e.g., advanced or ultra-high steel grades). The steel material grade of the outer structure 12 should be chosen depending on the design space for the battery bracket 10 and the impactor force which the battery bracket 10 is designed (or configured) to resist. In contrast, the cold roll-formed steel profile forming the inner structure 14 is made of the material belonging to the group of steel materials having a lower steel material grade than the steel material grade of the outer structure 12. For example, with regard to the (offset) yield point $R_{p0.2}$ of the steel materials, the (offset) yield point of the outer structure 12 is greater than the (offset) yield point of the inner structure 14. Steel with a lower material grade may provide less rigidity but a higher degree of ductility such that larger deformations are possible without breakage when compared to steel having a higher material grade. The inner structure shall absorb energy over its entire travel (e.g., in event of deformation) as far as possible without breaking. A choice of the materials as described in the foregoing allows for the shape of the inner structure 14 to adapt to changes in the shape of the outer structure 12 upon deformation of the latter due to external impact forces. This will be described in more detail below with respect to FIGS. 4A and 4B.

The outer structure 12 has, with respect to the z-axis of the coordinate system, a lower part 12a and an upper part 12b.

The lower part 12a and the upper part 12b may be divided into approximately half of the outer structure 12 along the x-direction, for example, with reference to FIG. 1. A cavity C is formed between the lower part 12a and the upper part 12b of the outer structure 12. On the left end of the outer structure 12 (e.g., with respect to the view provided by FIG. 1), the cavity C has an opening O. The cavity C is closed at its end opposite to the opening O.

Two flanges, a lower flange 120a and an upper flange 120b, are arranged at the opening O. The lower flange 120a is formed as part of the lower part 12a of the outer structure 12, and correspondingly, the upper flange 120b is formed as part of the upper part 12b of the outer structure 12. Each of the flanges 120a, 120b protrudes away from the opening O. The flanges 120a, 120b are each configured to be fixed to the outer side face 22 of the battery pack case 20. Thus, the flanges 120a, 120b respectively provide contact regions 122, 124 configured to be brought into areal contact (e.g., surface contact) with the outer side face 22 of the battery pack case 20. In the embodiment shown in FIG. 1, the outer side face 22 may not necessarily have an essentially planar shape. For example, an upper region of the outer side face 22 (e.g., the region of the outer side face 22 where it contacts with the upper flange 120b) is essentially arranged upright (e.g., forms a plane spanned by the z-axis and the y-axis), whereas a lower region of the outer side face 22 is inclined with respect to the y-z-plane by an angle. Consequently, the shape of the flanges 120a, 120b reflects (or corresponds to) the shape of the surface of the respective regions on the outer side face 22 to which the flanges 120a, 120b are to be fixed. Thus, in the illustrated embodiment, the upper flange 120b is arranged upright (or vertical) and the lower flange 120a is inclined with respect to the y-z-plane by the same angle as the lower region of the outer side face 22.

In FIG. 1, the battery bracket 10 is illustrated in a state of being mounted on the outer side face 22 of the battery pack case 20, for example, each of the flanges 120a, 120b is affixed to the outer side face 22. The fixation of the flanges 120a, 120b to the outer side face 22 is realized by, in the illustrated embodiment, welding. To facilitate the welding, the outer side face 22 may include an outer layer 24 made of steel. However, in alternative embodiments, the fixation of the flanges 120a, 120b to the outer side face 22 may, alternatively or additionally, be realized by other fastening methods, such as screws, rivets, and/or the like.

Referring to FIG. 1, the outer structure 12 may be approximately divided into a left region and a right region when viewed in the y-axis direction. Starting from the flanges 120a, 120b, the lower and upper parts 12a, 12b of the outer structure 12 extend toward each other in the left region of the outer structure 12, when viewed in the x-direction of the coordinate system. In other words, the outer structure 12 of the embodiment of the battery bracket 10 shown in FIG. 1 tapers in the left region of the outer structure 12. In contrast, the lower and upper parts 12a, 12b of the outer structure 12 extend in parallel in the right region of the outer structure 12.

The inner structure 14 is accommodated in the cavity C formed inside the outer structure 12. The inner structure 14 meanders between the upper part 12b and the lower part 12a of the outer structure 12. In the embodiment shown in FIG. 1, the inner structure 14 contacts the inner surface of the outer structure 12 at four contact areas 31, 32, 33, 34 such that the lower part 12a and the upper part 12b the outer structure 12 are contacted in an alternating manner by the inner structure 14. For example, a first end of the inner structure 14 forms a first contact area 31 at where it contacts the upper part 12b of outer structure 12 within the tapering region (e.g., the left region) of the outer structure 12. Then, when following the meandering line of the inner structure 14 in the cross-sectional view of FIG. 1, the next contact of the inner structure 14 with the outer structure 12 is at the lower part 12a of the outer structure 12 within the tapering region of the latter at the second contact area 32. Further following the inner structure 14 in view of FIG. 1, the inner structure 14 again contacts the upper part 12b in the region of the third contact area 33. The third contact area 33 is located in a portion of the outer structure 12 where the lower and upper parts 12a, 12b extend in parallel to each other. The inner structure 14 bends down to again contact, in turn, the lower part 12a of the outer structure 12, in the region where the lower and upper parts 12a, 12b extend in parallel to each other (e.g., the right region of the outer structure 12 as shown in FIG. 1; see above).

The inner structure 14 provides support from the inside of the outer structure 12 to the lower and upper parts 12a, 12b of the outer structure 12 at the four contact areas 31, 32, 33, 34 such that the outer structure 12 is stabilized in the region where the inner structure 14 extends within the cavity C. In some embodiments, the inner structure 14 is fixed to the outer structure 12 at each of the four contact areas 31, 32, 33, 34. However, in other embodiments, the inner structure 14 may not be fixed to the outer structure 12 at least at some of the contact areas 31, 32, 33, 34. Even in such an embodiment, however, the inner structure 14 may support to the outer structure 12. Upon deformation of the outer structure 12, contact areas of the inner structure 14 may slide or glide along the inner surface of the outer structure 12. However, such sliding or gliding is prevented in the contact areas at where the inner structure 14 is fixed to the outer structure 12. In embodiments in which the inner structure 14 is not fixed to the outer structure 12 or is fixed thereto at only some of the contact areas 31, 32, 33, 34, deformation of the outer structure 12 may have more impact on the inner structure 14 (e.g., more deformation energy may be absorbed by the inner structure 14 upon deformation of the outer structure 12) in comparison to embodiments in which the inner structure 14 and the outer structure 12 are fixed to each other at each of the contact areas 31, 32, 33, 34.

Fixations between the inner structure 14 and the outer structure 12 may be welding. However, in other embodiments of the battery bracket 10, the fixation between the inner structure 14 and the outer structure 12 may, alternatively or additionally, be realized by other fastening methods, such as screws, rivets, and/or the like.

The inner structure 14 may also be fixed to the outer side face 22 of the battery pack case 20. In the embodiment shown in FIG. 1, the inner structure 14 is fixed to the outer side face 22 in a region 30, which is on a surface of the inner structure 14 between the first contact area 31 and the second contact area 32, as described above. To that end, the shape of the inner structure 14 reflects, in the region to contact the outer side face 22 of the battery pack case 20, the geometry of the respective region of the outer side face 22. Thus, the inner structure 14 is configured to be brought into areal (or surface) contact with the outer side face 22.

The fixation between the inner structure 14 and the outer side face 22 may be welding. To facilitate the welding, the outer side face 22 may include an outer layer 24 made of steel. However, in other embodiments of the battery bracket 10, the fixation between the inner structure 14 and the outer side face 22 may, alternatively or additionally, be realized by other fastening methods, such as screws, rivets, or the like.

The inner structure 14, which is accommodated in the cavity C formed by the outer structure 12, may not completely fill the cavity C. As shown in FIG. 1, a certain portion of the cavity C may be left void (e.g., the inner structure 14 may not extend into the portion of the cavity C left void). Here, the inner structure 14 fills the portion of the cavity C within the tapering region of the outer structure 12. From the tapering region of the outer structure 12, the inner structure 14 extends into the right portion of the outer structure 12 (in the view depicted in FIG. 1) where the lower and the upper parts 12a, 12b extend parallel to each other. However, the latter region (e.g., the right portion of outer structure 12) it is not filled by the inner structure 14. Accordingly, an end portion of the outer structure 12 located opposite to the opening O of the cavity C is left void. This is schematically indicated in FIG. 1 by the vertical dashed line B separating, with respect to the x-axis of the coordinate system, a first portion of the outer structure 12 at where the inner structure 14 is present (e.g., the region between the outer side face 22 of the battery pack case 20 and the dashed line B; referred to as the "filled portion" F of the battery bracket 10 hereinafter) from a second portion of the outer structure 12 at where the structure 14 is not present (e.g., the region between the dashed line B and the right end of the outer structure 12; referred to as the "void portion" V of the battery bracket 10 hereinafter).

In above-described embodiment of the battery bracket 10 according to an embodiment of the present disclosure, the outer structure 12 is supported by the inner structure 14 only in the filled portion F. In the void portion V, however, the outer structure 12 does not enjoy any support from inside. Consequently, the overall rigidity of the filled portion F is higher than the overall rigidity of the void portion V. Thus, in effect of external forces acting on the battery bracket 10 will be described in further detail below with reference to FIGS. 4A and 4B.

Figure 2:
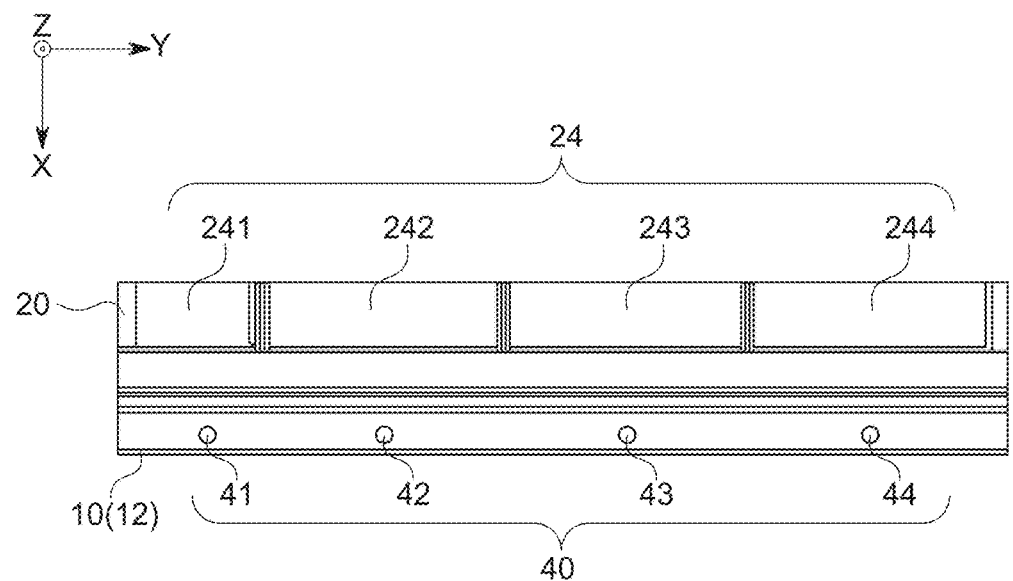
FIG. 2 is a schematic top view of a battery bracket according to an embodiment.

FIG. 2 is a schematic top view of an embodiment of the battery bracket 10 according to the present disclosure. As in FIG. 1, the battery bracket 10 is shown in a state of being mounted to the battery pack case 20. Only a part of the battery pack case 20 is shown in FIG. 2. The battery bracket 10 extends linearly along the y-direction of the coordinate system. In the top view of FIG. 2, only the outer structure 12 of the battery bracket 10 is visible. A plurality of openings (e.g., through-holes) 40 is provided in the end of the battery bracket 10 depicted as its bottom end in the view of FIG. 2. The bottom end of the battery bracket 10 as illustrated in FIG. 2 corresponds to the right end of the battery bracket 10 as shown in FIG. 1. The plurality of openings 40 allows for mounting the battery bracket 10 into a vehicle. The plurality of openings 40 is arranged as a series of through-holes 41, 42, 43, and 44 stringed along a direction parallel to the y-axis. Each of the through-holes 41, 42, 43, 44 is arranged in the void portion V of the battery bracket 10 (see FIG. 1) such that the shape of the inner structure 14 is not affected by pins, screws, or other means used for mounting the battery bracket 10 into a vehicle.

At its upper end (with respect to the view of FIG. 2), the battery bracket 10 is fixed to the outer layer 24 of (or covering) the outer side face 22 of the battery pack case 20 (see, e.g., FIG. 1). As shown in FIG. 1, the outer layer 24 is extends (or is reverted) around the lower and upper edges of the outer side face 22 to cover at least a part of the lower and upper side faces of the battery pack case 20.

Figure 3:
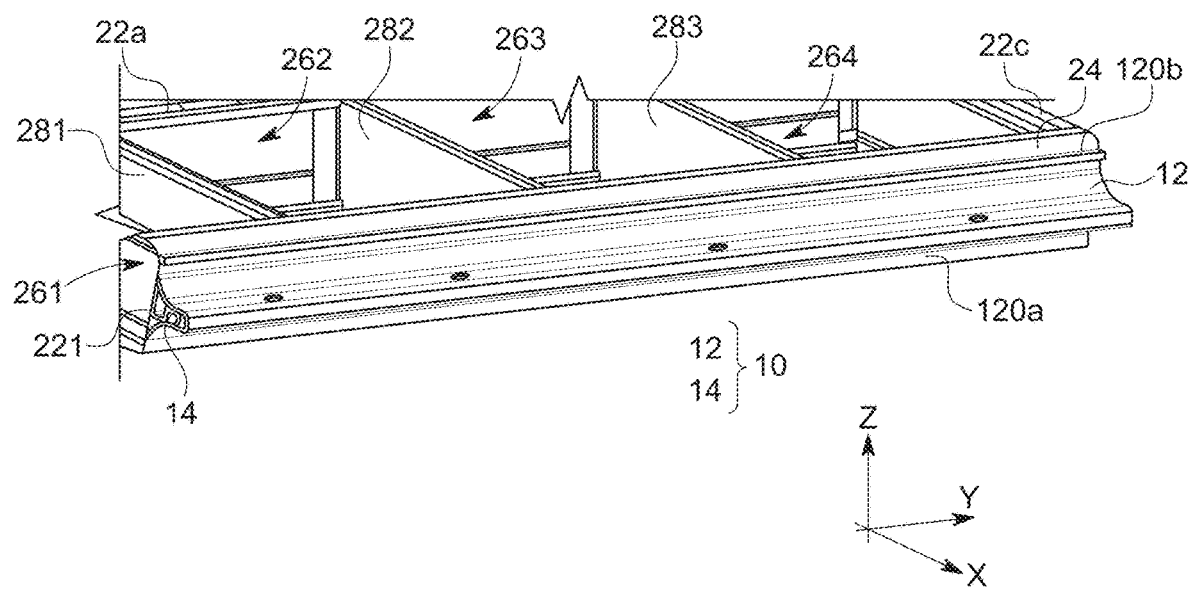
FIG. 3 is a schematic three-dimensional view of a battery bracket according to an embodiment.

FIG. 3 is a three-dimensional schematic view of the battery bracket 10 according to an embodiment of the present disclosure in a state in which it is mounted to the outer side face 22 of the battery pack case 20. The battery pack case 20 is confined by a rear side 22a, which is opposite to the outer side face 22 to which the battery bracket 10 is affixed. To the right, the battery pack case 20 is confined by a right side face 22c. The left side of battery pack case 20 is not shown in FIG. 3. Instead, the structure of the battery pack case 20 as described in the following can be continued to (or applied to) the left side. As shown in FIG. 3, the battery pack case 20 may be subdivided into a plurality of compartments 261, 262, 263, 264 respectively separated from each other by separators 281, 282, 283. The separators 281, 282, 283 may act as an inner stiffness (or stiffening) structure for the battery pack case 20. Each of the compartments 261, 262, 263, 264 is configured to accommodate a stack of battery cells. In the embodiment of the battery pack case 20 illustrated in FIG. 3, the compartments 261, 262, 263, 264 are aligned or stacked one after the other along the y-direction. The outer side face 22 of the battery pack case 20 is formed by the entirety of the respective outer side faces of the compartments 261, 262, 263, 264 facing into the x-direction (only an outer side face 221 of the leftmost compartment 261 is visible in FIG. 3). In battery pack cases 20 suitable to be used with embodiments of the battery bracket 10 according to the present disclosure, the outer layer 24 may, thus, be correspondingly subdivided into a plurality of layer-stripes 241, 242, 243, 244 as shown in FIG. 2. The layer-stripes may act as a thermal interface to the battery module or the corresponding battery cell. Each of the layer-stripes 241, 242, 243, 244 covers a corresponding area of the outer side face 22 in the region of the respective compartment 261, 262, 263, 264. Adjacent layer-stripes 241, 242, 243, 244 may the separated from each other in the regions of the separators 281, 282, 283.

The separators 281, 282, 283 not only separate the individual compartments 261, 262, 263, 264 from each other but also act an inner stiffener structure within the battery pack case 20 (e.g., the separators 281, 282, 283 are able to absorb mechanical energy exerted onto the outer side face 22 or the rear side 22a). This stabilizes the battery pack case 20 and plays a role in the distribution of external forces acting on the battery pack case 20 via transmission through the battery bracket 10. This will be explained in further detail below with reference to FIGS. 4A and 4B.

The outer side face 22 of the battery pack case 20 (only the outer side face 221 of the leftmost compartment 261 is visible in FIG. 3, which forms a part of the outer side face 22 as described above) is covered by the outer layer 24 made of steel. The outer structure 12 is affixed (e.g., by welding) to the outer layer 24 covering the outer side face 22 by the lower flange 120a and upper flange 120b as described above with respect to FIG. 1. Similarly, the inner structure 14 is affixed (e.g., by welding) to the outer layer 24 is described with respect to FIG. 1.

Figure 4B:
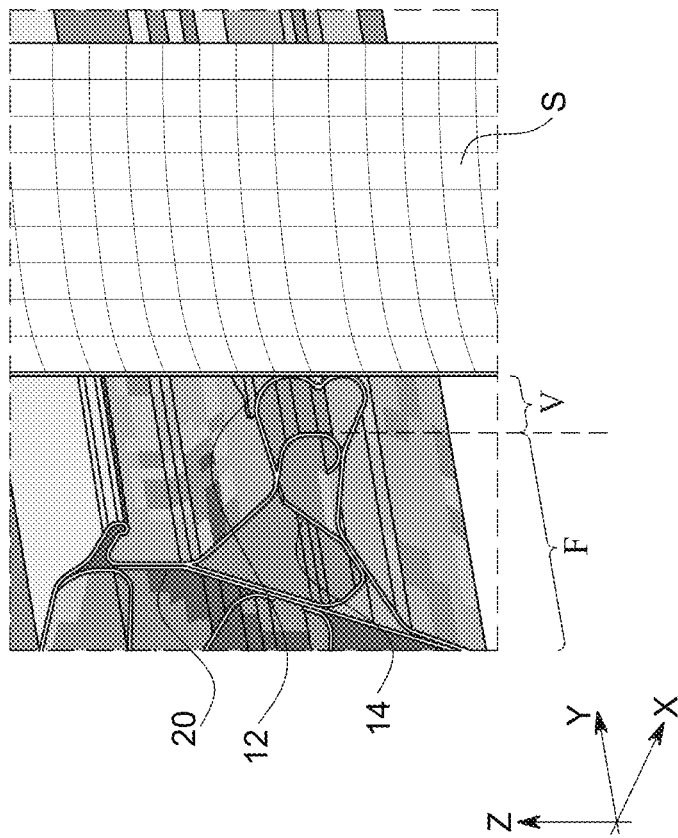
FIGS. 4A and 4B is schematically illustrates the deformation of a battery bracket according to an embodiment in a state in which an external force impacts the battery bracket.
Figure 4A:
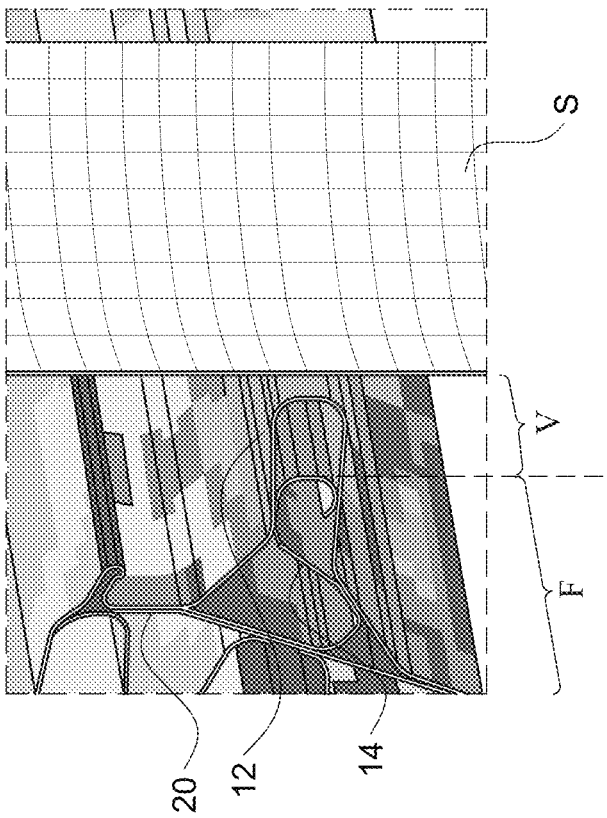

In FIGS. 4A and 4B, the deformation of the battery bracket 10 according to an embodiment of the present disclosure when an external mechanical force is applied to the battery bracket 10 is schematically illustrated by a three-dimensional simulation (e.g., a finite element analysis, or FEA, calculations) of the battery bracket 10 and (a portion of) the battery pack case 20, to which the battery bracket 10 is attached in a manner as described above with reference to FIGS. 1-3. The inner and outer structures 12, 14 of the battery bracket 10 as well as the outer side face 22 of the battery pack case 20 extend linearly along the y-direction. The internal strains evolving within the cold roll-formed steel sheets of the outer and inner structures 12, 14 of the battery bracket 10 as well as within the outer side face 22 of the battery pack case 20 upon the impact of an external force are indicated by shades of a gray scale. A darker shade of gray denotes higher strain compared to a lighter shade of gray. Because only the relative differences/changes in the strains are relevant in the present context, no units are provided in FIGS. 4A and 4B with regard to the gray scale. The filled portion F and the void portion V of the battery bracket 10 are indicated by curly brackets, which refer to the intersectional cut being visible at the front of the three-dimensional illustrations, with the intersectional cuts being taken through a plane parallel to the x-z-plane of the coordinate system.

In the illustrated simulation, the source of the external mechanical force (e.g., the foreign impactor) is indicated by a geometrically simple external structure with an S shape essentially like a part of a curved surface area of cylinder with a symmetry axis extending parallel to the z-direction. The external structure S pushes, by its curved surface area, into the void portion V of the outer structure 12 of battery bracket 10 in a direction opposite to the x-direction of the coordinate system. Due to this force, the battery bracket 10 is deformed. In FIGS. 4A and 4B, the deformation may be depicted in an exaggerated manner in comparison to typical situations in reality for the sake of illustration.

As already pointed out above with reference to FIG. 1, the overall rigidity of the filled portion F is higher than the overall rigidity of the void portion V. This results in two different "crush zones," "crush folding zones," or "quenching zones" provided by the battery bracket 10, as will now be explained. The mechanical function of the shown assembly can be described as follows: The outer structure 12 resists the force of the foreign impactor (in FIGS. 4A and 4B, the external structure S) and at the same time guide (e.g., distribute) the force of the foreign impactor onto the stiffness structure of the battery pack case 20. This is realized by a first crush zone corresponding to the void portion V and second crush zone corresponding to the filled portion F.

Crush zones generally are zones that may deform upon application of an external force, such as by an impact. To deform the crush zones, at least some of the energy provided by the external force is absorbed and distributed within the structures forming the crush zones. The energy transmitted to the battery pack case 20 is then reduced by the amount of energy absorbed by the crush zones or, in other words, the impact of the external force onto the battery pack case 20 is alleviated by the crush zones.

Due to the lower rigidity of the battery bracket 10 in the first crush zone, the battery bracket 10 is more easily deformed upon impact of an external force in comparison to the second crush zone. Thus, a main part of an external force is alleviated by the first crush zone. A remainder of the force, however, is transmitted to the second crush zone with higher rigidity. The second crush zone can also be deformed, but its main purpose is to distribute the (e.g., remainder of the) external force on the outer side face 22 and, thus, decrease the punctate impact (e.g., the local impact onto a relatively small region of the outer side face 22) of the external force on the outer side face 22 of the battery pack case 20. Then, due to the distribution of the external force by the battery bracket 10, the mechanical energy provided by the external force can be further absorbed by internal structures of the battery pack case 20, such as, for example, the separators 281, 282, 283 (each of them arranged in parallel to the x-z-plane of the coordinate system) as described above with reference to FIG. 3.

The inner structure 14 provides support to (e.g., supports) the outer structure 12. To that end, the inner structure 14 is configured to stabilize the walls of the outer structure 12 (e.g., the internal walls of the cavity C in the region of the filled portion F) and, moreover, guides (e.g., distributes), via the region of the filled portion F (e.g., via the second crush zone), the external (or impactor) force to other stiffness structures of battery pack case 20, thereby reducing the surface pressure on the outer side face 22 of the battery pack case 20. Accordingly, the geometry of the internal structure is designed to have crush folding suitable geometry, for example, it is designed such that the intended crush folding direction (against the x-axis) is perpendicular to the roll forming direction (parallel to the y-axis). Similarly, the material grade of the inner structure 14 is defined adequately as described above.

As can be taken from the foregoing, the first and second crush zones provide progressive resistance behavior of the battery bracket 10 against an external force, such as the force exerted by the external structure S.

FIG. 4A and FIG. 4B are distinguished in that the force applied to the battery bracket 10 by the external structure S is less in the embodiment depicted in FIG. 4A in comparison to the experiment depicted in FIG. 4B. Again, the absolute values of the applied forces are not relevant in the present context. In the experiment illustrated in FIG. 4A, only the void portion V of the battery bracket 10 is affected by the force exerted by the external structure S. In other words, solely the void portion V of the battery bracket 10 (e.g., the first crush zone) undergoes deformation, whereas the filled portion F (e.g., the second crush zone) remains undeformed. Accordingly, the internal strain present in the outer structure 12 in the region of the void portion V is large in comparison to the internal strain present in the outer structure 12 in the region of the filled portion F and in the inner structure 14 as can be seen from the different shades of gray. In other words, the impact applied by the external structure S towards the battery pack case 20 is almost completely absorbed by the first crush zone.

In the experiment illustrated by FIG. 4B, the impact applied towards the battery pack case 20 by the external structure S is increased in comparison to the experiment shown in FIG. 4A. Accordingly, the strain present within the outer structure 12 in the region of the first crush zone causes plainly visible deformation of the outer structure 12. For example, the lower part 12a and the upper part 12b of the outer structure 12 are moved apart from each other, when viewing along the z-direction. Within the region of the second crush zone, however, the lower part 12a and the upper part 12b of the outer structure 12 are held together, up to certain degree, by the inner structure 14 meandering between the lower part 12a and the upper part 12b of the outer structure 12 and affixed to both the lower and upper parts 12a, 12b of the outer structure 12. Furthermore, the external structure S penetrates into the battery bracket 10 so far that the inner structure 14 is quenched by the external structure S. Accordingly, the inner structure 14 is also affected by the impact caused by the external structure S, resulting in a deformation of the inner structure 14. In other words, the impact towards the outer side face 22 of the battery pack case 20 is alleviated by both the first crush zone and the second crush zone.

SOME REFERENCE SYMBOLS

- 10 battery bracket
- 12 outer structure
- 12a lower part of outer structure
- 12b upper part of outer structure
- 14 inner structure
- 20 case for a battery pack (battery pack case)
- 22 outer side face
- 22a rear side
- 22c right side face
- 24 outer layer
- 30 contact region
- 31, 32, 33, 34 contact areas
- 40 plurality of openings
- 41, 42, 43, 44 openings
- 120a lower flange
- 120b upper flange
- 221 outer side face of first compartment
- 261, 262, 263, 264 compartments
- 281, 282, 283 separators (stiffness structure of battery pack case)
- 241, 242, 243, 244 layer-stripes (thermal interface to cell/battery module)
- B dashed line
- C cavity
- F filled portion
- O opening
- S external structure providing a force
- V void portion
- x, y, z axes of a Cartesian coordinate system

What is claimed is:

1. A battery bracket for mounting a battery pack case to a vehicle, the battery bracket comprising:
    an outer structure having a lower part and an upper part forming a cavity therebetween, the outer structure being configured to be fixed to an outer side face of the battery pack case; and
    an inner structure in the cavity and meandering between the lower part and the upper part of the outer structure, a lower contact area and an upper contact area being formed at where the inner structure contacts an inner surface of the lower part of the outer structure and the inner surface of the upper part of the outer structure, respectively,
    wherein the outer structure and the inner structure are each made of one piece.

2. The battery bracket according to claim 1, wherein the inner structure is fixed to the lower part in the lower contact area, and/or
    wherein the inner structure is fixed to the upper part in the upper contact area.

3. The battery bracket according to claim 1, wherein the cavity has an opening,
    wherein the lower part comprises a lower flange at the opening,
    wherein the upper part comprises an upper flange at the opening, and
    wherein the lower flange and the upper flange are each configured to be fixed to the outer side face of the battery pack case.

4. The battery bracket according to claim 3, wherein a region of the cavity opposite to the opening is left void.

5. The battery bracket according to claim 3, wherein a cross-sectional profile of the outer structure tapers when viewed along a direction from the opening of the cavity through the cavity or into the cavity.

6. The battery bracket according to claim 1, wherein a region of the inner structure is configured to be fixed to the outer side face of the battery pack case.

7. The battery bracket according to claim 6, wherein the region of the inner structure configured to be fixed to the outer side face of the battery pack case is on a surface of the inner structure between the lower contact area of the inner structure and the upper contact area of the inner structure.

8. The battery bracket according to claim 1, wherein a cross-sectional profile of the battery bracket is constant at least in a region of the battery bracket when viewed in a direction perpendicular to the outer side face.

9. The battery bracket according to claim 1, wherein the outer structure is made of a sheet of metal, and/or
wherein the inner structure is made of a sheet of metal.

10. The battery bracket according to claim 9, wherein the outer structure is made of a sheet of steel, and/or
wherein the inner structure is made of a sheet of steel.

11. The battery bracket according to claim 1, wherein the outer structure is made of a cold roll-formed steel, and/or
wherein the inner structure is made of a cold roll-formed steel.

12. The battery bracket according to claim 1, wherein the outer structure and the inner structure are each made of a cold roll-formed steel, and
wherein the cold roll-formed steel of the outer structure is of a higher steel material grade than the cold roll-formed steel of the inner structure.

13. A battery pack comprising a case, the case having the outer side face on which the battery bracket according to claim 1 is fixed.

14. The battery pack according to claim 13, wherein the outer side face comprises an outer layer made of steel, and/or
wherein the case comprises a stiffener in a planar shape and extending perpendicular to the outer side face to which the battery bracket is fixed.

15. A vehicle comprising the battery pack according to claim 13.

16. The battery bracket according to claim 1, wherein the lower contact area is a first lower contact area,
wherein the upper contact area is a first upper contact area,
wherein a second lower contact area is formed at where the inner structure contacts a second area of the inner surface of the lower part of the outer structure, and
wherein a second upper contact area is formed at where the inner structure contacts a second area of the inner surface of the upper part of the outer structure.

17. The battery bracket according to claim 16, wherein the first lower contact area, the first upper contact area, the second lower contact area, and the second upper contact area are sequentially arranged along a length of the inner structure.

* * * * *